(12) United States Patent
Greenwood

(10) Patent No.: US 6,666,791 B1
(45) Date of Patent: Dec. 23, 2003

(54) BEARING SUPPORT FOR INFINITELY-VARIABLE-RATIO TRANSMISSION OUTPUT DISCS

(75) Inventor: Christopher J. Greenwood, Preston (GB)

(73) Assignee: Torotrak (Development) Limited, Preston (GB)

( * ) Notice: Subject to any disclaimer, the term of this patent is extended or adjusted under 35 U.S.C. 154(b) by 0 days.

(21) Appl. No.: 09/914,726
(22) PCT Filed: Feb. 23, 2000
(86) PCT No.: PCT/GB00/00646
§ 371 (c)(1), (2), (4) Date: Oct. 2, 2001
(87) PCT Pub. No.: WO00/52358
PCT Pub. Date: Sep. 8, 2000

(30) Foreign Application Priority Data

Mar. 1, 1999 (GB) .............................................. 9904666

(51) Int. Cl.[7] .............................................. F16H 15/38
(52) U.S. Cl. .............................................. 476/42; 476/40
(58) Field of Search .............................. 476/40, 42, 46

(56) References Cited

U.S. PATENT DOCUMENTS

| | | |
|---|---|---|
| 1,774,175 A | 8/1930 | Erban |
| 2,595,367 A | 5/1952 | Picanol |
| 2,871,714 A | 2/1959 | Weisel |
| 4,186,616 A | 2/1980 | Sharpe |
| 4,934,206 A | 6/1990 | Nakano |
| 5,807,203 A | 9/1998 | Imanishi et al. |

FOREIGN PATENT DOCUMENTS

| | | | |
|---|---|---|---|
| EP | 0 743 218 | * | 5/1996 |
| GB | 2 320 070 | | 6/1998 |

OTHER PUBLICATIONS

Patent Abstracts of Japan, vol. 1997, No. 06, Jun. 30, 1997 & JP 09 042400, Feb. 10, 1997.

\* cited by examiner

Primary Examiner—William C. Joyce
(74) Attorney, Agent, or Firm—Nixon & Vanderhye P.C.

(57) ABSTRACT

A variator transmission apparatus (10) comprises an input shaft (12), one or more input discs (14, 16) mounted on the shaft for rotation therewith, one or more inner discs (18, 20), the input and output discs defining between them one or more toroidal cavities, a plurality of rollers (22, 24) located within the one or more cavities for transmitting rotation from the outer disc(s) (14, 16) to the inner disc(s) in which means are provided for preventing the end load locking the inner discs (18, 20) to the shaft (12).

10 Claims, 3 Drawing Sheets

BEARING SUPPORT FOR INFINITELY-VARIABLE-RATIO TRANSMISSION OUTPUT DISCS

This application is the US national phase of International Application No. PCT/GB00/00646, filed Feb. 23, 2000, which designated the U.S., the entire content of which is hereby incorporated by reference.

BACKGROUND OF THE INVENTION

1. Field of the Invention

The present invention relates to transmissions such as an infinitely-variable-ratio transmission of the toroidal race rolling friction type and relates particularly, but not exclusively, to an arrangement for mounting the centre on the shaft in a manner which maintains a desired degree of flexibility between said discs and the shaft.

2. Discussion of Prior Art

In the above apparatus, a main shaft takes drive from, for example, an engine of an automobile and transmits this drive to two outer discs mounted at proximal and distal ends of the shaft. Drive is taken from two inner discs mounted back to back between the outer discs and are supported on a bearing, the inner diameter of which engages with the shaft such that the discs are free to rotate relative to the shaft. Motion is transferred from the outer discs to the inner discs via a plurality of rollers positioned in toroidal cavities formed by contoured surfaces of the inner and outer discs. One or more of the outer discs is subjected to an axial load such that the rollers make contact with the faces of the respective inner and outer discs in order to transmit power therebetween. Typically the inner discs are output discs and power is transferred from the output discs via, for example, a chain drive to a further transmission component such as an epi-cyclic gearbox. In an alternative arrangement the inner discs are input discs and power is transferred thereto by a chain drive or similar.

Whilst the above arrangement provides a perfectly acceptable transmission the shaft is subjected to a degree of bending as a direct result of power being transmitted to or from the inner discs via the chain drive. Whilst the degree of bending is well within acceptable limits, it must be accommodated if the integrity of the toroidal cavities is to be maintained.

In order to appreciate the problem outlined above we refer to FIG. 1 from which it will be appreciated that if one or other of the outer discs, 14,16 are tilted relative to the normal alignment axis A, the integrity of the toroidal cavity 26,28 will be compromised.

Such tilting might, for example, take place at high torque transmissions when it is possible that shaft 12 might deflect under the strain. This degree of flexing whilst being relatively small must be accommodated without destroying the integrity of the toroidal cavities. A number of proposals exist for compliantly mounting the outer discs 14,16 but no such proposals are known in connection with the inner disc or discs 18,20. Conventionally, the inner disc or discs 18,20 are mounted on the input 12 by means of a bearing 32 which is positioned such that it is in the same axial plane as the neutral plane of the inner disc or discs (as shown in FIG. 1 and FIG. 2). Under normal circumstances, the end load force to which outer disc 16 is subjected is passed trough the variator via the rollers and the inner discs such that said inner discs are effectively squeezed between the outer discs. Any variation in the position of the outer discs is transmitted to the rollers and thence to the inner discs which, as shown in FIG. 1, are often combined as a single unit. In the position of the rollers as shown in FIG. 1, the force is transmitted along lines $L_1$, $L_2$ and cross the centre line $C_L$ of the shaft at an angle θ. The particular arrangement of the FIG. 1 design means that the load lines $L_1$, $L_2$ cross the centre line $C_L$ as point equidistant from the bearing but significantly axially displaced relative thereto. As a consequence of this geometry, a significant force is transmitted through the rollers in the direction of lines $L_1$, $L_2$ and the inner disc or discs 18,20. This force acts to locate the inner discs in the desired manner whilst said discs are still able to rock about the centre line $C_L$ of the shaft such that they maintain the integrity of the two toroidal cavities even when one or other or both of the outer discs are tilted out of plane A.

In the alternative arrangement of FIG. 2 the inner discs 18,20 are axially displaced and a chain drive portion is provided therebetween, load lines $L_1$, $L_2$ are coincident at a point $O_1$ which is within the neutral plane of the discs $P_D$. Once again, bearing 32 is still positioned equidistant between the disc surfaces 18, 20 and on the neutral plane of the discs $P_D$. It will be appreciated that, as a result of the specific geometric arrangement of these discs, the force transmitted through these discs will not be able to locate the inner discs in the desired position as the discs will not be free to rock or pivot about point $O_1$, thus compromising the integrity of the toroidal cavity.

U.S. Pat. No. 1,774,175 provides a variator arrangement in which the central discs are mounted on a common bearing which is off-set from the neutral axis or the central discs. This arrangement does not, however, angle the rollers such that their load lines cross the neutral axis of the support shaft at a common point and does not therefore, benefit from the advantages of the present invention.

SUMMARY OF THE INVENTION

It is an object of the present invention to provide a transmission apparatus in which the inner discs are mounted on the shaft in a manner which reduces and possibly eliminates the above phenomenon and thereby ensures the integrity of the toroidal cavities is maintained throughout the full operating range of the variator. Additionally, the present invention aims to accommodate a desired degree of movement of the inner discs in order to provide the desired degree of compliance without adversely affecting the above Accordingly, the present invention provides a variator transmission apparatus comprising:

a shaft having a neutral axis $C_L$;

a pair of outer discs, mounted on the shaft for rotation therewith;

a pair of inner discs, journalled to said shaft by means of a bearing; and a plurality of rollers having load lines $L_1$, $L_2$ ad being located in said cavities for transmitting torque between the discs and characterised in that in at least one position of said rollers the load lines $L_1$, $L_2$ cross the neutral axis $C_1$ at a common point $O_1$ and in that the inner discs pivot about a point $O_2$ which is axially displaced relative to common point $O_1$.

In one arrangement the outer discs are input discs and the inner discs are output discs.

In an alternative arrangement the outer discs are output discs and the inner discs are input discs.

Advantageously, the bearing comprises an inner and outer race between which a plurality of bearing operate, said outer race having an inner radius of curvature $R_B$ having a centre of origin chosen to facilitate rocking of the inner discs relative to said shaft.

Preferably, a variator as claimed in any one of the preceeding claims in which the radius $R_B$ is such as to allow free rocking of said inner discs without interference from said bearing.

Alternatively, the radius $R_B$ is such as to allow a rocking of said inner discs whilst providing some resistance thereto.

Conveniently, the inner discs comprise axially displaced discs connected to each other and a power drive is connected between said inner discs.

Advantageously, said inner discs in the same plane as the plane $P_B$ of the bearing.

Conveniently, a chain or belt drive connects to said inner discs by means of a plurality of teeth provided on or associated with said inner discs.

BRIEF DESCIPTION OF THE DRAWINGS

The present invention will now be more particularly described by way of example only with reference to the accompanying drawings, in which.

DETAILED DISCUSSION OF EMBODIMENTS

Figure 1:
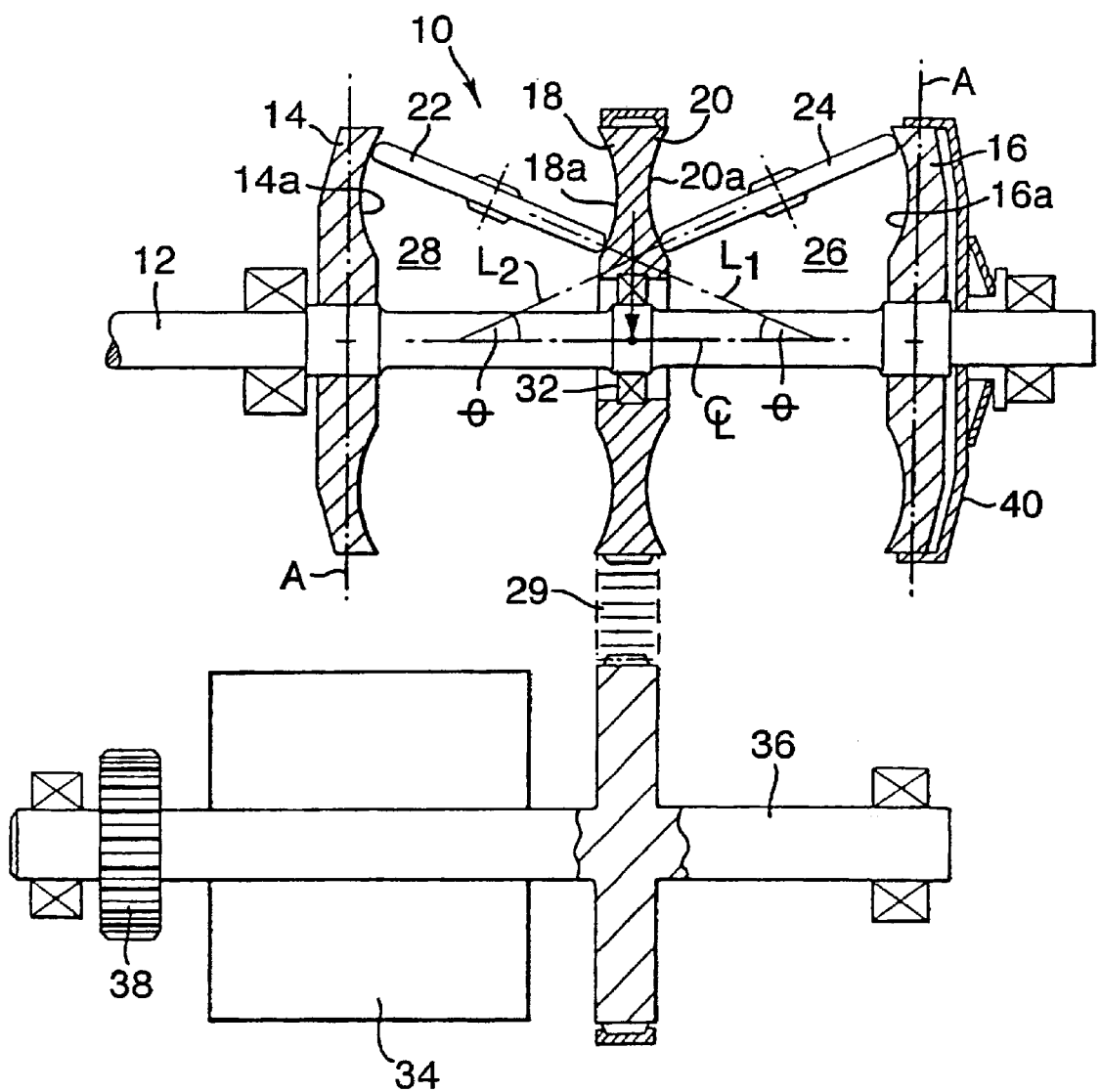
FIG. 1 is a diagrammatic representation of an infinitely-variable-ratio transmission of the type to which the present invention may be applied.

Referring now to the drawings in general, but particularly to FIG. 1 it will be seen that an infinitely-variable-ratio transmission (CVT) includes a variator shown generally at and comprising an input shaft 12, first and second outer discs 14, 16, two inner discs 18, 20 which may be combined as one unitary structure as shown in this particular drawing, and a set of rollers 22, 24 which are located in toroidal cavities 26, 28 formed between the curved surfaces 14a and 18a, 16a and 20a of the discs. In this particular example the outer discs are input discs and the inner discs are output discs. However, as discussed above, the inner discs could be the input discs and the outer discs the output discs should that suit the design requirements. A chain drive 29 which, for the purposes of clarity, is shown only in part is mounted between the inner discs and transmits power from said discs to a further component of the CVT shown generally at 30. The two outer discs 14, 16 are mounted for rotation with the shaft 12 e.g. by means of splined mountings, whilst the inner discs are mounted via a bearing 32 on the shaft such that they are free to rotate relative thereto. An epicyclic gear arrangement shown schematically at 34 is employed between the output shaft 36 and output gear 38 in a manner well known to those skilled in the art and therefore not described herein. An end load arrangement shown generally at 40 and shown in more detail in FIG. 2 provides an axial load on the outer discs such that traction between the discs and the roller is maintained throughout normal operation.

Figure 2:
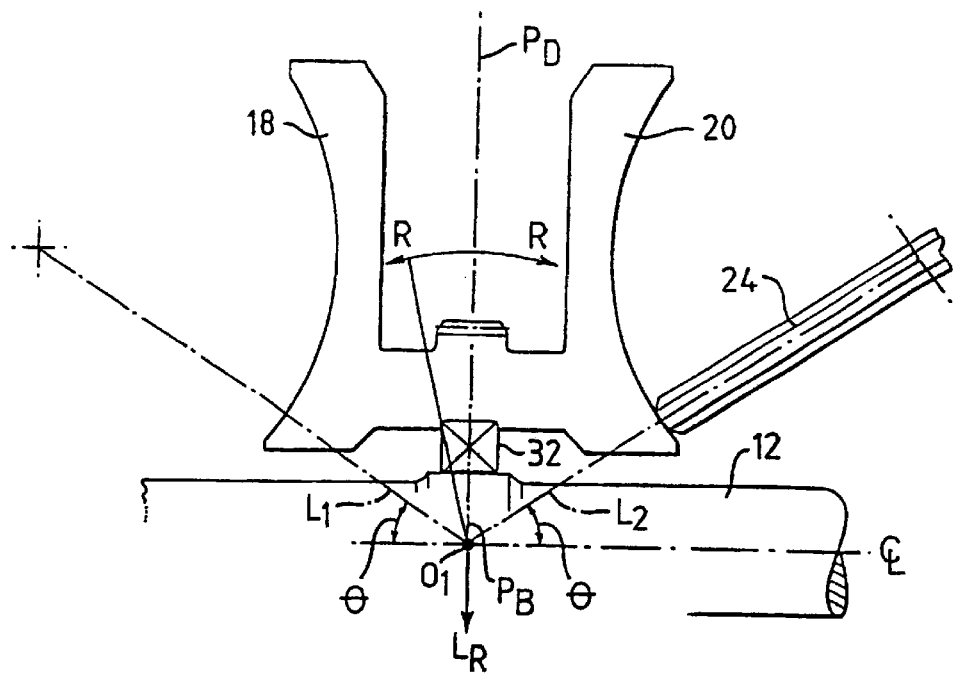
FIG. 2 is a cross-sectional view of one form of inner disc arrangement known in the art.

In the known design of FIG. 2 the inner disc bearing 32 is positioned centrally between the two inner discs 18,20 such that the central plane $P_B$ of the bearing 32 extends in the same plane as a plane $P_D$ equidistant between the faces of the two inner discs. Plane $P_D$ is sometimes referred to as the "neutral plane of the discs" and it is referred to as such in the claims of the present application.

Operation of the above-mentioned variator is conventional and requires no explanation herein, save for the phenomenon known as "lock-up". This phenomenon is best explained by reference to the position of the rollers in FIG. 2, from which it will be appreciated that the end load applied to the discs is transmitted through the rollers in the direction of load lines $L_1$ and $L_2$. In certain positions of the rollers, the two load lines cross the centre line $C_L$ of the shaft at a point $O_1$ beneath the bearing 32, at an equal angle $\theta$ and have a resultant $L_R$ which passes through the centre of bearing 32. When the rollers are in this position the loading effect locks the inner discs' 18,20 to the shaft and the discs are no longer able to rock relative thereto in the direction of arrows R. It will be appreciated that with the inner discs locking in this manner, it will be impossible for the inner discs to alter their position relative to the shaft and the integrity of the toroidal cavity may be compromised.

Figure 3:
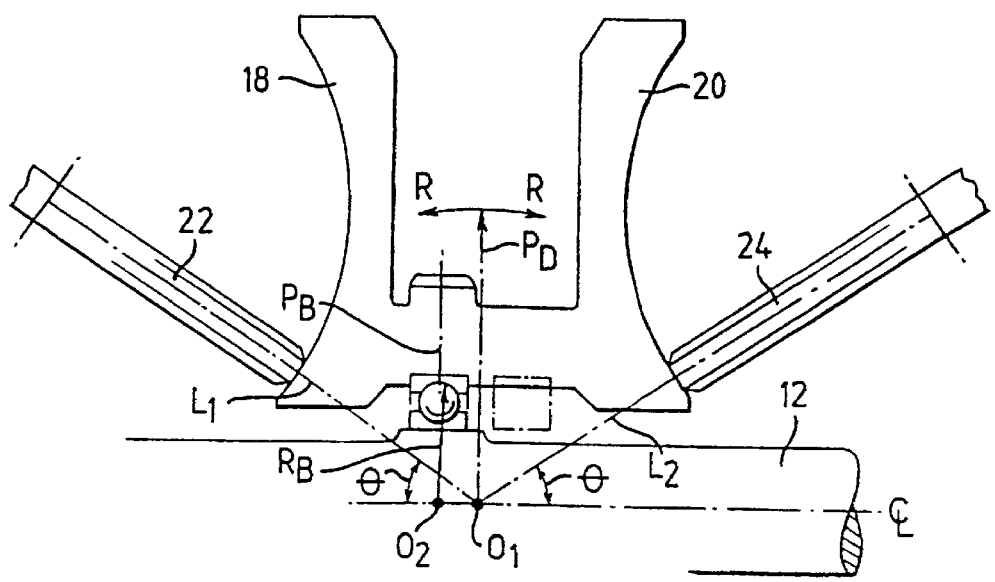
FIG. 3 is a cross-sectional view of the inner discs and bearing arrangement of the present invention.
Figure 4:
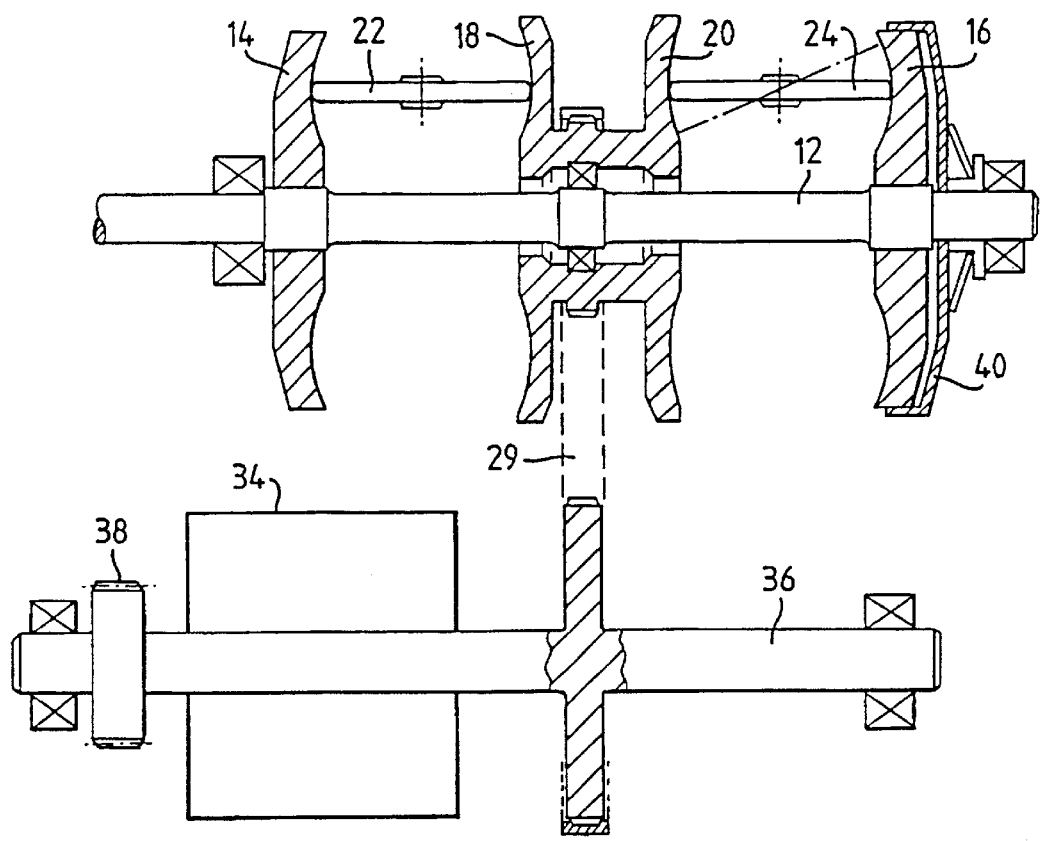
FIG. 4 is a cross-sectional view of a variator incorporating the present invention.

In order to overcome the above-mentioned problem, the present invention provides the variator assembly having an inner disc& and support bearing arrangement as shown in FIG. 3. Whilst the variator is substantially the same as that shown in FIG. 1 and, for the purposes of brevity common features are not discussed further herein, it will be appreciated that the bearing 32 is now no longer on the "neutral plane of the discs" but is displaced axially relative thereto. In the particular example of FIG. 3, the bearing 32 is displaced towards the upstream end, that is to say the power input end of the variator but remains underneath the combined inner discs 18,20 and continues to support them in the conventional manner. Clearly, one could displace the bearing towards the downstream end (power output end) without materially affecting the performance of the device, which is described in detail later herein. This alternative is shown in dotted outline.

By off-setting the bearing 32 such that plane $P_B$ now no longer extends in plane $P_D$, one can prevent undesirable rocking motion of the inner discs 18,20 in the direction of arrows R and, hence, retain the integrity of the toroidal cavities without compromising the compliance of the arrangement. In more detail and referring to FIGS. 2 and 3, it can be seen that the load lines $L_1$, $L_2$ still cross the centre-line of the support shaft at the same angle $\theta$ but their relationship to the neutral plane of the discs $P_D$ has now been altered. In effect, the pivot point $O_1$ of the discs is now no longer coincident with the plane of the bearing. Consequently, the roller loading on the inner discs 18,20 can, once again, act to locate the discs in the desired position. Movement of the discs 18,20 for reasons of compliance is accommodated by virtue of the fact that said discs now pivot about point $O_2$ which is no longer coincident with $O_1$.

Whilst the normal in-built tolerances associated with support bearings such as 32 are expected to be sufficient to allow the above-mentioned rocking to take place without undue constraint, it has been found that profiling the inner radius $R_B$ of the outer bearing race 32a can provide an extra degree of flexibility, if that is desired. In the particular example of FIG. 3, the radius $R_B$ is chosen such that it's centre of origin is coincident with the centre line $C_L$ of the shaft, as this is the point about which the discs 18,20 rock.

It will, however, be appreciated that the radius $R_B$ maybe other than this without significantly affecting the performance of the present invention. Indeed, a slightly smaller radius might be used if one wished to provide some degree of resistance to rocking. Alternatively, as mentioned above, the bearing need have no such curvature and one might simply rely on the small degree of relative movement between varying components that is often a feature of such elements.

What is claimed is:

1. A variator transmission apparatus comprising:

a shaft having a neutral axis;

a pair of outer discs, mounted on the shaft for rotation therewith;

a pair of inner discs joined for rotation together and journalled to said shaft by means of a bearing; and a plurality of rollers having load lines and being located in said cavities for transmitting torque between the discs and wherein, in at least one position of said rollers, the load lines cross the neutral axis at a common point and in that the inner discs pivot about a point which is axially displaced relative to the common point.

2. A variator as claimed in claim 1 in which the outer discs are input discs and the inner discs are output discs.

3. A variator as claimed in claim 1 in which the outer discs are output discs and the inner discs are input discs.

4. A variator as claimed in claim 1 in which the bearing comprises an inner and outer race between which a plurality of roller bearings operate, said outer race having an inner radius of curvature having a centre of origin chosen to facilitate pivoting of the inner discs relative to said shaft.

5. A variator as claimed in claim 4 in which the inner radius of curvature has a center of curvature coincident with the neutral axis to allow free pivoting of said inner discs without interference from said bearing.

6. A variator as claimed in claim 4 in which the inner radius of curvature is slightly smaller than the inner radius of said outer race and is such as to allow a pivoting of said inner discs whilst providing some resistance thereto.

7. A variator as claimed in claim 1 in which the inner discs comprise axially displaced discs connected to each other and a power drive is connected between said inner discs.

8. A variator as claimed in claim 1 and in which a power drive in the form of a chain or belt drive connects to said inner discs by means of a plurality,of teeth provided on or associated with said inner discs.

9. A variator as claimed in claim 1 in which a bearing plane is axially displaced relative to a neutral plane of the discs.

10. A variator transmission apparatus comprising:

a shaft having a neutral axis;

a pair of outer discs, mounted on the shaft for rotation therewith;

a pair of inner discs, journalled to said shaft by means of a bearing; and a plurality of rollers having load lines and being located in said cavities for transmitting torque between the discs and wherein, in at least one position of said rollers, the load lines cross the neutral axis at a common point and in that the inner discs pivot about a point which is axially displaced relative to the common point, where the inner discs comprise axially displaced discs connected to each other and a power drive is connected between said inner discs wherein the power drive connects to said inner discs in the same plane as the plane of the bearing.

* * * * *